United States Patent
Mullins

(10) Patent No.: US 6,377,881 B1
(45) Date of Patent: *Apr. 23, 2002

(54) GPS GUIDED GROUND-CLEARING APPARATUS AND METHOD

(76) Inventor: Donald B. Mullins, 32903 Welton Ct., Fulshear, TX (US) 77441

( * ) Notice: Subject to any disclaimer, the term of this patent is extended or adjusted under 35 U.S.C. 154(b) by 0 days.

This patent is subject to a terminal disclaimer.

(21) Appl. No.: 09/525,637

(22) Filed: Mar. 14, 2000

Related U.S. Application Data

(63) Continuation-in-part of application No. 08/840,340, filed on Apr. 28, 1997, now Pat. No. 6,044,316, which is a continuation-in-part of application No. 08/366,626, filed on Dec. 30, 1994, now Pat. No. 5,666,792.

(51) Int. Cl.[7] .............................................. A01D 41/00
(52) U.S. Cl. ...................... 701/50; 701/215; 56/10.2 A; 56/10.2 R; 56/10.2 F; 172/2
(58) Field of Search ................................ 701/50, 2, 23, 701/26, 213, 215, 300; 56/10.2 A, 10.2 R, 10.2 F; 172/2, 4.5

(56) References Cited

U.S. PATENT DOCUMENTS

| | | | |
|---|---|---|---|
| 4,180,964 A | 1/1980 | Panshire | 56/10.2 A |
| 4,244,123 A | 1/1981 | Lazure et al. | 37/348 |
| 4,318,266 A | 3/1982 | Taube | 56/10.2 R |
| 4,439,939 A * | 4/1984 | Blau | 37/231 |
| 4,482,960 A | 11/1984 | Pryor | 701/28 |
| 4,532,757 A | 8/1985 | Tutle | 56/328.1 |
| 4,888,890 A | 12/1989 | Studebaker et al. | 37/348 |
| 4,912,643 A | 3/1990 | Beirxe | 702/150 |
| 4,967,362 A | 10/1990 | Schutten et al. | 701/50 |
| 4,994,970 A | 2/1991 | Noji et al. | 701/25 |
| 5,100,229 A | 3/1992 | Lundberg et al. | 356/3.12 |
| 5,155,490 A * | 10/1992 | Spradley, Jr. et al. | 342/357.03 |
| 5,182,566 A | 1/1993 | Ferguson et al. | 342/357.06 |
| 5,220,876 A | 6/1993 | Monson et al. | 111/130 |
| 5,375,663 A | 12/1994 | Teach | 172/4.5 |
| 5,438,817 A | 8/1995 | Nakamura | 56/10.2 A |
| 5,666,792 A * | 9/1997 | Mullins | 56/10.2 A |
| 5,761,095 A | 6/1998 | Warren | 702/166 |
| 5,904,296 A | 5/1999 | Doherty et al. | 239/61 |
| 5,924,371 A | 7/1999 | Flamme et al. | 111/177 |
| 5,930,743 A | 7/1999 | Warren | 702/166 |
| 5,949,373 A | 9/1999 | Eslambolchi et al. | 342/357 |
| 5,978,723 A | 11/1999 | Hale et al. | 701/50 |
| 5,982,325 A | 11/1999 | Thornton et al. | 342/357 |
| 5,991,687 A | 11/1999 | Hale et al. | 701/207 |
| 6,000,703 A | 12/1999 | Schubert et al. | 280/5.518 |
| 6,044,316 A * | 3/2000 | Mullins | 701/50 |

* cited by examiner

Primary Examiner—William A. Cuchlinski, Jr.
Assistant Examiner—Marthe Y. Marc-Coleman
(74) Attorney, Agent, or Firm—David M. O'Brian

(57) ABSTRACT

A tracked GPS guided ground clearing apparatus and method for clearing brush, small trees, snow, ice and other types of debris, dependent upon remote positioning data and radio communication signals, having an apparatus locator system for determining the location of the apparatus and a guidance system for navigating and maintaining the apparatus in a desired direction of travel along a particular line of travel and for traversing a plurality of specific data points along the particular line of travel, relative to the surface of the earth.

17 Claims, 12 Drawing Sheets

GPS GUIDED GROUND-CLEARING APPARATUS AND METHOD

CROSS REFERENCE TO RELATED APPLICATION

The present application is a continuation-in-part of the application of Donald B. Mullins, U.S. Ser. No. 08/840,340, filed on Apr. 28, 1997 now U.S. Pat. No. 6,044,316, entitled METHOD AND APPARATUS FOR NAVAGATING A REMOTELY GUIDED BRUSH CUTTING, CHIPPING AND CLEARING APPARATUS.

U.S. Ser. No. 08/840,340 is a continuation-in-part of application U.S. Ser. No. 08/366,626, filed Dec. 30, 1994 and now U.S. Pat. No. 5,666,792, entitled REMOTELY GUIDED BRUSH CUTTING, CHIPPING AND CLEARING APPARATUS AND METHOD.

FIELD OF THE INVENTION

The present invention relates generally to a GPS guided ground-clearing apparatus and method. Specifically, the present invention relates to a tracked or tread propelled apparatus and method for ground-clearing applications, including the clearing of brush, small trees, vines, tall grasses, snow and/or ice. The present invention is dependent upon remote positioning data, having a locator system for determining a location of the apparatus and a guidance system to achieve and maintain a desired direction of travel, including a method for navigating a specific line of travel and for navigating a plurality of particular points along the line of travel, by the apparatus relative to the surface of the earth, with or without the assistance of having visual reference points.

BACKGROUND OF THE INVENTION

The ability to quickly and accurately navigate through and traverse over lightly to moderately wooded and/or thicketed terrain, snow or ice covered terrain, along particular points of a specific line of travel, without the assistance of conventional land-based survey techniques and crew, and with or without visual reference points, is of significant importance. Presently it is a difficult task to clear snow, ice and/or small to moderate sized brush consisting of small trees, thick briar patches, overgrown vines, grasses and weeds, all in an effort to accurately locate and travel a desired line of travel and a plurality of specific points along that line. Often, the desired path or line of travel may, for example, include marked or unmarked property lines, seismic lines, rights-of-way, ski slopes, paths, trails and the like. Even where the survey coordinates, longitude and latitude coordinates or other types of location data are known for the specific property line, seismic line or right-of-way, impediments such as thick brush, overgrown vegetation, ice, large snow drifts, etc., may present significant barriers to physically locating these pathways. In the past, the location and clearing of property lines, seismic lines, rights-of-way and the like, in lightly to moderately wooded and/or thicketed areas has generally required a surveyor and a lead survey crew to begin at a known location and slowly and methodically hand clear and cut a path and measure the appropriate distance in the desired direction to locate property lines, seismic lines, rights-of-way and the like, while a brush clearing crew and/or a brush clearing device follow behind the surveyor. Determining the location of snow and/or ice covered property lines, seismic lines, rights-of-way, paths, ski slopes and the like, may be impossible despite having a ground surveyor and crew. Although conventional ground survey procedures for identifying property lines, seismic fines, rights-of-way and the like are generally accurate, nonetheless, these procedures are very slow, labor intensive, expensive and may be impossible in snow covered conditions.

It would be of great benefit to not only be able to quickly and accurately navigate through and traverse over lightly to moderately wooded and thicketed terrain and snow or ice covered terrain, but, at the same time to be able to locate a desired direction of travel and a plurality of specific points along the line of travel, and clear a pathway through the snow, ice and/or wooded and thicketed areas to provide easy access for motorized and/or foot traffic through said pathway.

Heretofore, there have been no methods of navigating a tracked or continuous tread propelled vehicle which integrates an apparatus locator system, an apparatus guidance system, and a navigation system, over snow, ice or brush covered property lines, seismic lines, rights-of-way, roads and paths, or other predetermined route, while clearing a pathway for motorized and/or foot traffic, without the need for traditional survey procedures. For the apparatus locator system to be effective throughout the world, it would need to be dependent on a satellite guidance system. One apparatus locator system may include, for example, communications equipment which could receive signals from the Global Positioning System (GPS) satellite network. A detailed explanation of the Global Positioning System is set forth in U.S. Pat. No. 5,155,490, GEODETIC SURVEYING SYSTEM USING MULTIPLE GPS BASE STATIONS, issued to Spradley, Jr. et al. The GPS satellite network comprises 24 satellites which produce positioning signals and provide for the calculation of distance measurements. A minimum of three GPS satellite signals are necessary to determine any position on the earth. The GPS satellite signals can be received by one or more base stations, located at various positions on the earth's surface, and by a GPS antenna which may be mounted to the apparatus. The base station may receive and interpret the GPS satellite signals, however the base station produces a differential correction signal for use with the GPS satellite signals. The base station in turn sends the differential correction signal to a communication satellite which conveys the differential correction signal to a radio antenna mounted to the apparatus, or alternatively, the radio antenna may receive the differential correction signal directly from the base station. Additionally, a dual-purpose antenna can receive both the GPS satellite signals and the differential correction signal from the base station. The differential correction signal and the GPS satellite signals can be simultaneously interpreted by the guidance system, wherein the differential correction is applied to calculate the current position of the vehicle from the GPS satellite signals. The corrected position and location of the apparatus, with respect to the earth and the desired direction of travel, can then both be displayed by the guidance system, in selectively either a graphic manner or a digital manner. An operator, stationed on board the apparatus or remotely stationed from the apparatus but having access to the guidance system, could view the guidance system and in response thereto maneuver the apparatus to cut, chip and clear small to moderately sized brush or clear snow and ice, while traveling in a desired direction, i.e. over property lines, seismic lines, rights-of-way and the like.

Although the need for such a device and method of navigating has been long felt, the prior art, heretofore, has not provided such a device or method which meet all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, a GPS guided ground-clearing apparatus and method for navigating, dependent upon remote positioning data and radio communication signals, is presented to quickly and accurately navigate through and traverse over lightly to moderately wooded and thicketed or snow or ice covered terrain, along specific points of a particular line of travel, while at the same time clearing a pathway to provide passage for motorized and/or foot traffic through said pathway. The present invention provides a preferred embodiment method for remotely guiding a ground-clearing apparatus consisting of a tracked vehicle; a cutting head, or alternatively a snow plowing device, mounted to said vehicle for clearing ground; an apparatus locator system mounted to the vehicle for to determine the location of the apparatus with respect to the surface of the earth which receives the remote positioning data and radio communication signals; and a guidance system in signal communication with the apparatus locator system to process the remote positioning data and radio communication signals to navigate the apparatus in a desired direction of travel. The cutting head preferably includes a plurality of pivotal, U-shaped, throw-out knives mounted to a rotatable, horizontal shaft and a drive means for rotating the horizontal shaft. The snowplow, for example, may be any conventionally available snow plowing device, preferably comprised of a hydraulically supported blade or plow, mounted to the front of the vehicle. The guidance system may for example be a data processor and a navigation system, wherein the data processor includes a central processing unit and display unit for processing the remote positioning data, the radio communication signals and the survey coordinates of a desired or predetermined direction of travel, including, for example, the survey coordinates for property lines, seismic lines, snow covered roads or pathways, ski slopes, rights-of-way and the like. The guidance system may also include a video display screen for displaying to an operator the processed data, including the current position of the apparatus relative to the surface of the earth, and the desired direction of travel for the apparatus. The apparatus locator system may include, for instance, a GPS signal processing unit and one or more satellite/radio communication antenna or, alternatively a dual purpose antenna for receiving a plurality of remote positioning data signals produced from a guidance satellite system. The satellite/radio communication antenna or dual-purpose antenna may also receive a differential correction signal generated from a base station. The base station may, for example, be a conventional GPS base station. The base station may also be in communication with the remote positioning data signals produced by the guidance satellite system. The one or more satellite/radio communication antenna is preferably mounted to the vehicle and connected to a GPS signal-processing unit via a first coaxial communication link. The GPS signal-processing unit is also preferably in direct communication with the guidance system via a second coaxial communication link. The guidance satellite system may include any of the public access satellite systems, such as, for example the Coast Guard satellite guidance system. The guidance satellite system may also include any commercial or private satellite systems, such as for instance, the Omni-Star satellite guidance system. The base station may, for example, be a Coast Guard operated facility or may be privately operated, wherein users pay for the differential correction signal broadcast.

Alternatively, the apparatus locator system may include communication equipment in communication with an automated or semi-automated geodetic survey system. The alternate embodiment apparatus locator system may include for example a first communication antenna mounted to the apparatus. The geodetic survey system may further include, for example, a station unit and a reflector. The reflector is typically mounted to the apparatus or some other object which generally moves away from the station unit. The station unit may transmit a continuous laser signal or other type of signal to the reflector, wherein the reflector returns the signal back to the station unit. The station unit processes the reflected laser signal and, in response thereto, produces and transmits remote positioning data in the form of a radio signal to the guidance system. The guidance system may, for instance, be a data processor or control unit having a central processing unit and a visual display, which is mounted on the apparatus. The radio signal generated from the station unit contains location and positioning information regarding the reflector which is mounted to the apparatus. The guidance system processes the radio signal, determines the location of the apparatus, displays the location of the apparatus and the desired direction of travel for the apparatus.

The present invention includes a method for guiding a GPS guided ground clearing apparatus, the method preferably includes the steps of: receiving by an apparatus locator system, the remote positioning data and radio communication signals; conveying the remote positioning data and radio communication signals from the apparatus locator system to a guidance system; processing and displaying by the guidance system, the remote positioning data and radio communication signals transmitted from the apparatus locator system; interpreting, by an operator, the data processed by the guidance system to determine a current location of the apparatus with respect to the surface of the earth; and maneuvering of the apparatus by the operator, to guide the apparatus in a desired direction of travel.

Additionally, the present invention includes a method of navigating a vehicle, preferably comprising a ground clearing apparatus, dependent upon remote positioning data and radio communication signals, along specific data points of a particular line of travel, and includes the steps of: engaging a data processor and navigation system, mounted on the vehicle, wherein the data processor includes a video data display and is in communication with the remote positioning data and radio communication signals; selecting on the data processor and navigation system, a particular line of travel along which to navigate the vehicle; inputting in to the data processor and navigation system, a starting line of travel, a specific starting point on the particular starting line of travel from which to begin navigating the vehicle, a specific ending point on the particular starting line of travel and a plurality of data points on the starting line of travel between the specific starting point and the specific ending point; selecting from the data processor, a visual display format from which an operator of the vehicle can interpret the instantaneous position of the vehicle, a particular fine of travel and a plurality of specific data points, in relation to the surface of the earth and thereafter control the navigation of the vehicle; navigating the vehicle along the plurality of data points on the particular line of travel; and selectively providing for the input of additional lines of travel and additional specific data points along the additional lines of travel, to allow the vehicle to navigate a plurality of lines of travel.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

The above general description and the following detailed description are merely illustrative of the generic invention and additional modes, advantages and particulars will be readily suggested to those skilled in the art without departing from the spirit and the scope of the invention.

DETAILED DESCRIPTION OF THE INVENTION

Figure 1:
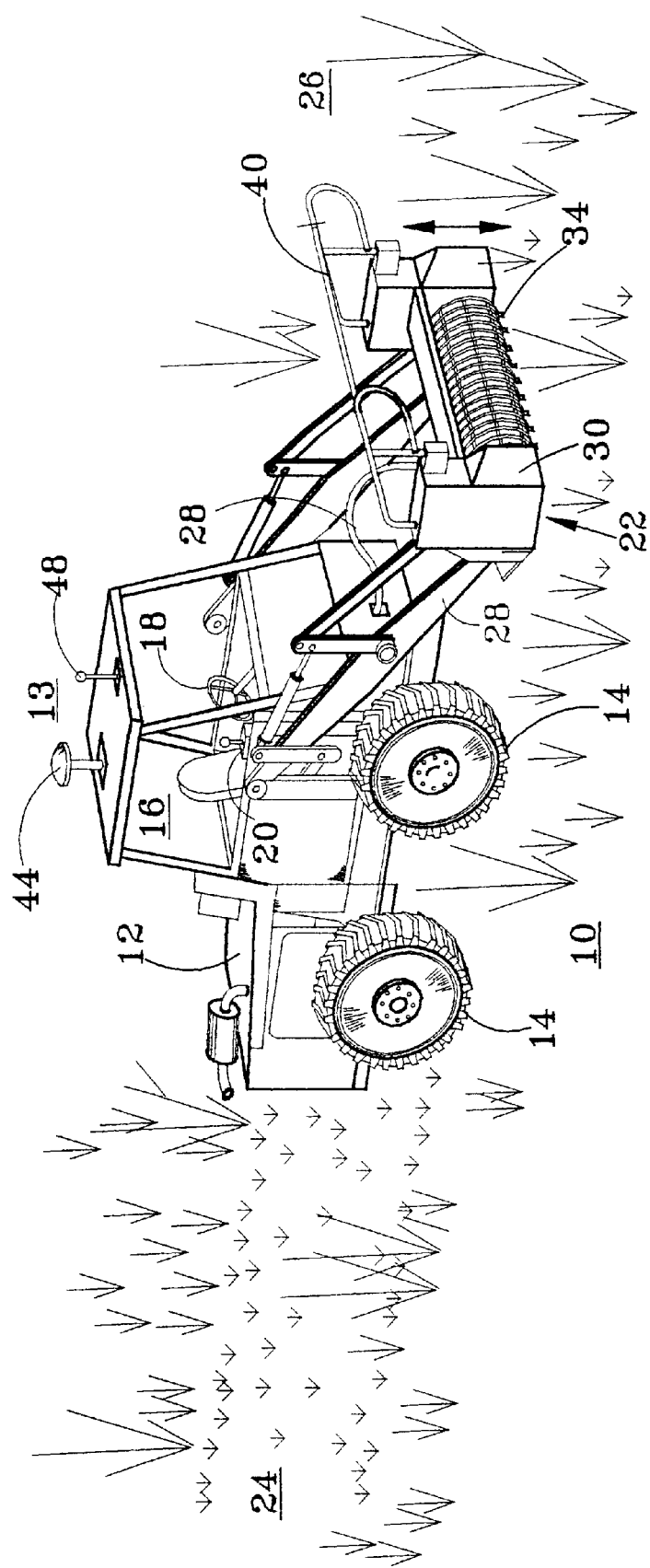
FIG. 1 is a perspective view of a remotely guided brush cutting, chipping and clearing apparatus.
Figure 2A:
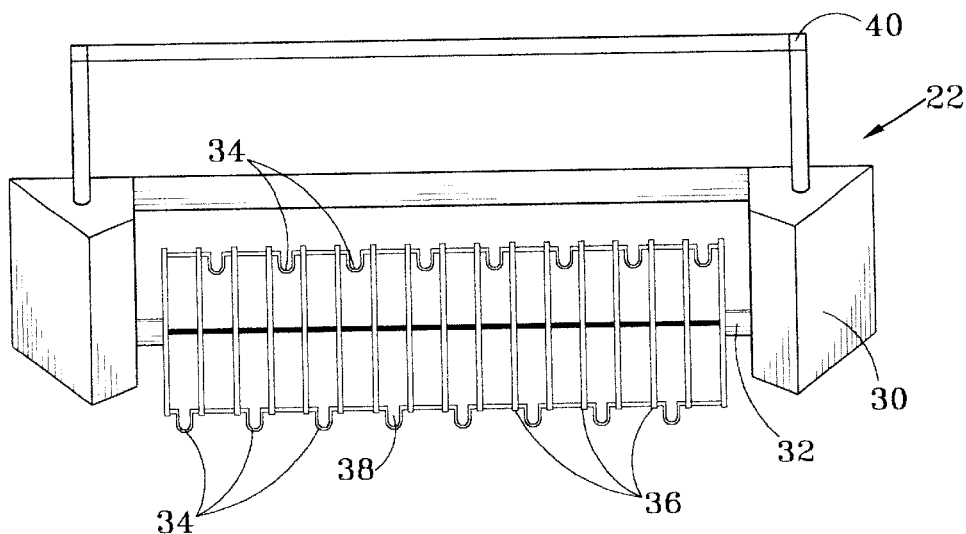
FIG. 2A is a front view of a preferred embodiment cutting head of the apparatus shown in FIG. 1, and the present invention shown in FIG. 11.
Figure 2B:
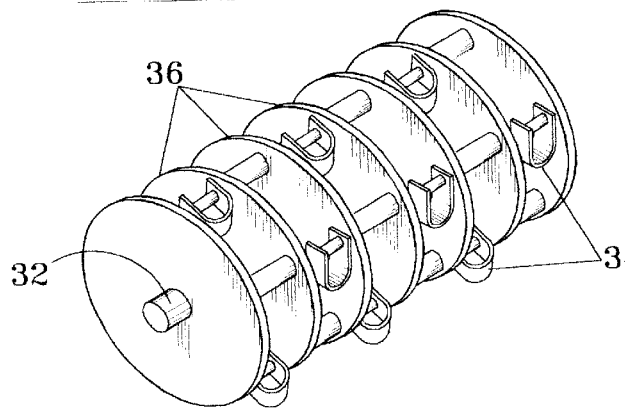
FIG. 2B is a partial cut-away, perspective view of the cutting head shown in FIG. 2A.
Figure 5:
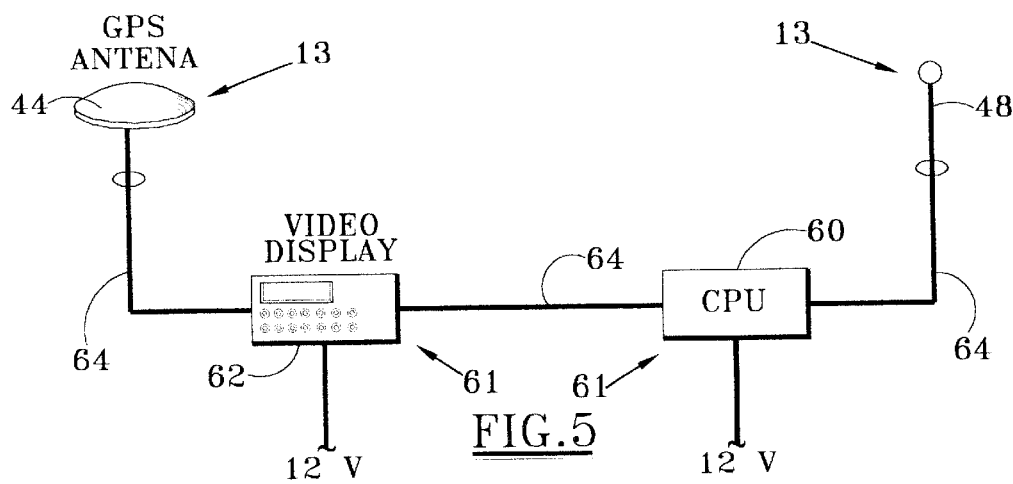
FIG. 5 is a schematic diagram illustrating the operation and relationship between the first satellite antenna, the preferred embodiment guidance system and the second communication antenna of the preferred embodiment of the present invention.

With reference to the drawings wherein like parts are designated by like numerals, FIG. 1 illustrates a remotely guided brush cutting, chipping and clearing apparatus 10, which is dependent upon remote positioning data and radio communication signals. The remotely guided brush cutting, chipping and clearing apparatus 10 preferably includes a vehicle 12; having three or more wheels 14; a cab 16 for accommodating an operator (not shown), a steering control means 18 for controllably maneuvering the vehicle 12, a power control means 20; and a cutting or cutter head 22 mounted to the vehicle 12 for cutting, chipping and clearing a pathway or particular line of travel 24 through an area of small to moderately sized brush 26. The cutter head 22 is mounted to the vehicle 12 via a hydraulic support system 28 which selectively raises and lowers the height of the cutter head 22. The cutter head 22 includes a housing 30 within which is secured a rotatable, horizontal shaft 32. The hydraulic support system 28 also provides rotational drive power for the horizontal shaft 32.

Figure 11:
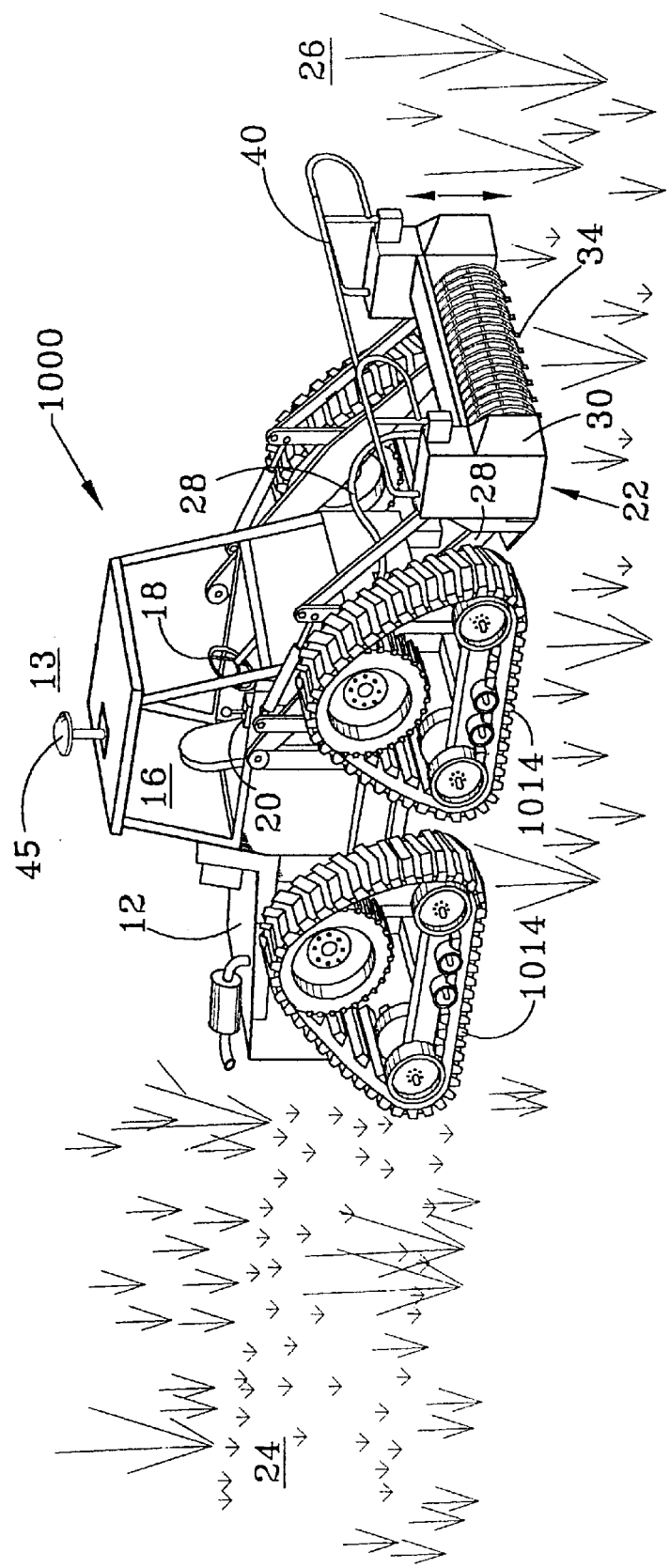
FIG. 11 is a perspective view of the preferred embodiment of the present invention, GPS guided ground-clearing apparatus.
Figure 12:
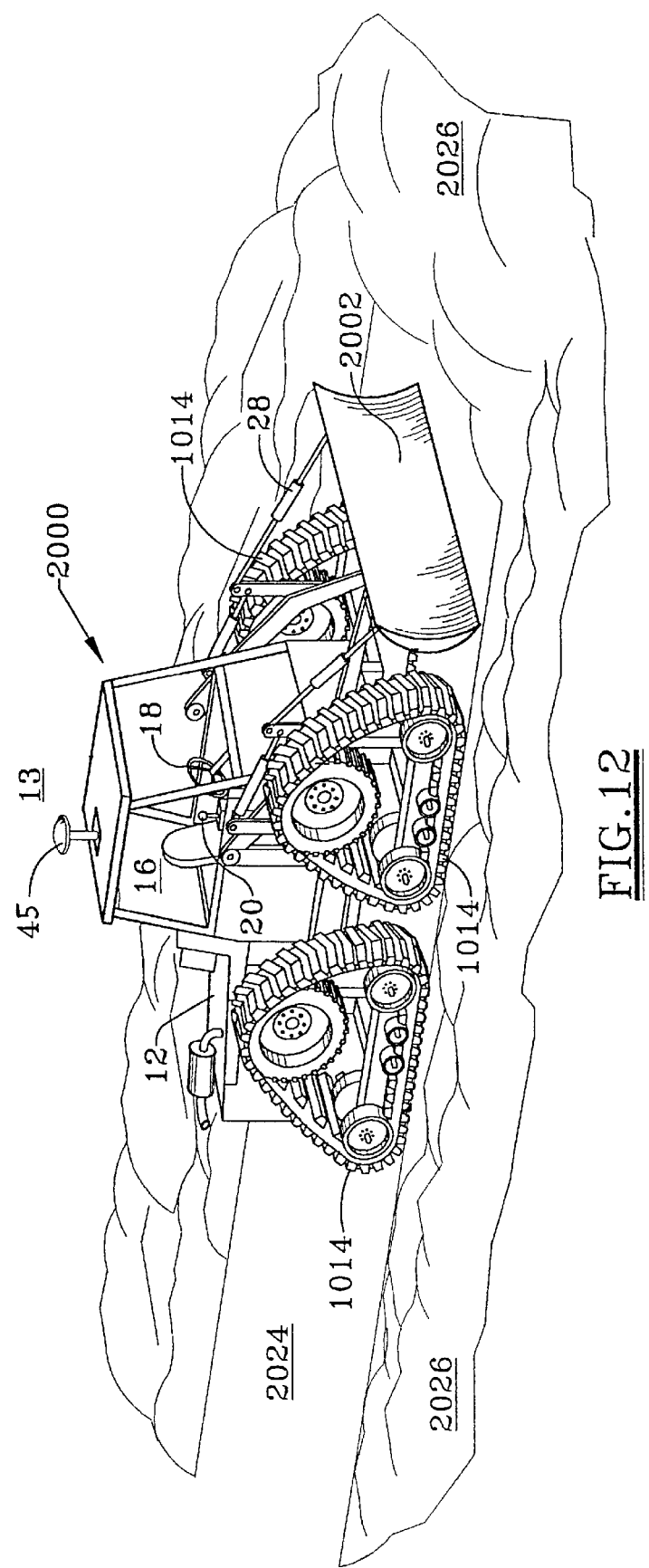
FIG. 12 is a perspective view of an alternate embodiment GPS guided ground-clearing apparatus.

Referring to FIG. 11, the preferred embodiment of the present invention, a GPS guided ground-clearing apparatus 1000 is depicted, where structure similar to that in FIG. 1, is similarly numbered. The present invention 1000 differs from the apparatus illustrated in FIG. 1, in that the present invention 1000 is propelled by two or more rotating tracks or flat surfaced tread 1014, which are conventionally mounted and engaged to the vehicle 12. The advantage of using rotating tracks or flat-surfaced tread 1014, rather than wheels 14 as shown in FIG. 1, is that the tracks 1014 distribute the weight of the vehicle 12 over a larger ground contact area which provides for improved mobility and steering in soft, damp, swampy, wet, icy and/or snow covered ground. Additionally, the tracks 1014, provide for improved stability on inclined or uneven surfaces (not shown) which are prevalent on unimproved terrain. The mobility and steering of conventional wheeled vehicles, similar to the one shown in FIG. 1, may be adversely affected in soft, damp, swampy, wet, icy and/or snow covered ground. The present invention GPS guided ground-clearing apparatus 1000 provides for improved steering in using the rotating tracks or flat-surfaced tread 1014. The rotating tracks or flat-surfaced tread 1014 can be of any type of conventional growser tracks or continuous rubber belt or tread. The growser tracks may for example, include aggressive pads including a steel cleat which grips the ground surface or alternatively a flat, non-damaging street pad having no cleat. The aggressive pads are not recommended for use on concrete or paved surfaces, since the cleat usually causes damage to the ground surface. Steel street pads may also include, for example, a rubber cover to provide additional cushioning to prevent damage to the ground surface. The alternate embodiment GPS guided ground clearing apparatus 2000, as depicted in FIG. 12, is equipped with a snow plow or blade 2002 for clearing snow and ice 2026 from a pathway, etc. 2024, rather than a cutter head 22, as shown in the preferred embodiment GPS guided ground-clearing apparatus 1000. The structure enumerated in FIG. 12 which is similar to the structure of FIG. 1 and FIG. 11, is similarly numbered. The blade 2002 is preferably hydraulically mounted to the vehicle 12 and operated from inside the cab 16. In all other respects, the alternate embodiment apparatus 2000, operates and functions as the preferred embodiment GPS guided ground-clearing apparatus 1000. The alternate embodiment apparatus 2000, provides for travel and snow plowing operations in blizzard or white-out conditions, where the operator has no visual reference points directing the navigation of the vehicle 12.

With reference to FIGS. 1, 2A, 2B and 11, a plurality of U-shaped throw-out knives 34 are shown mounted to a peripheral edge of a plurality of mounting discs 36. The mounting discs 36 are laterally mounted on and rotated by the rotatable, horizontal shaft 32. The plurality of throw-out knives 34 are pivotally affixed to a plurality of mounting discs 36 such that when the shaft 32 is rotated at high revolutions per minute, such as, for example, 60 rpm, the throw-out knives 34 pivot outward from the mounting discs 36 to extend a "trough" portion 38 having a very sharp edge, wherein the sharp edged trough portions 38 cut, chip and clear the brush 26. Additionally, the preferred embodiment cutter head 22 includes one or more bumpers 40 which facilitate the feeding of small to medium sized brush 26 into the cutter head 22 and the bumpers 40 also serve to protect the cutting head 22 from unintentional contact with non-brush related material (not shown).

Figure 3:
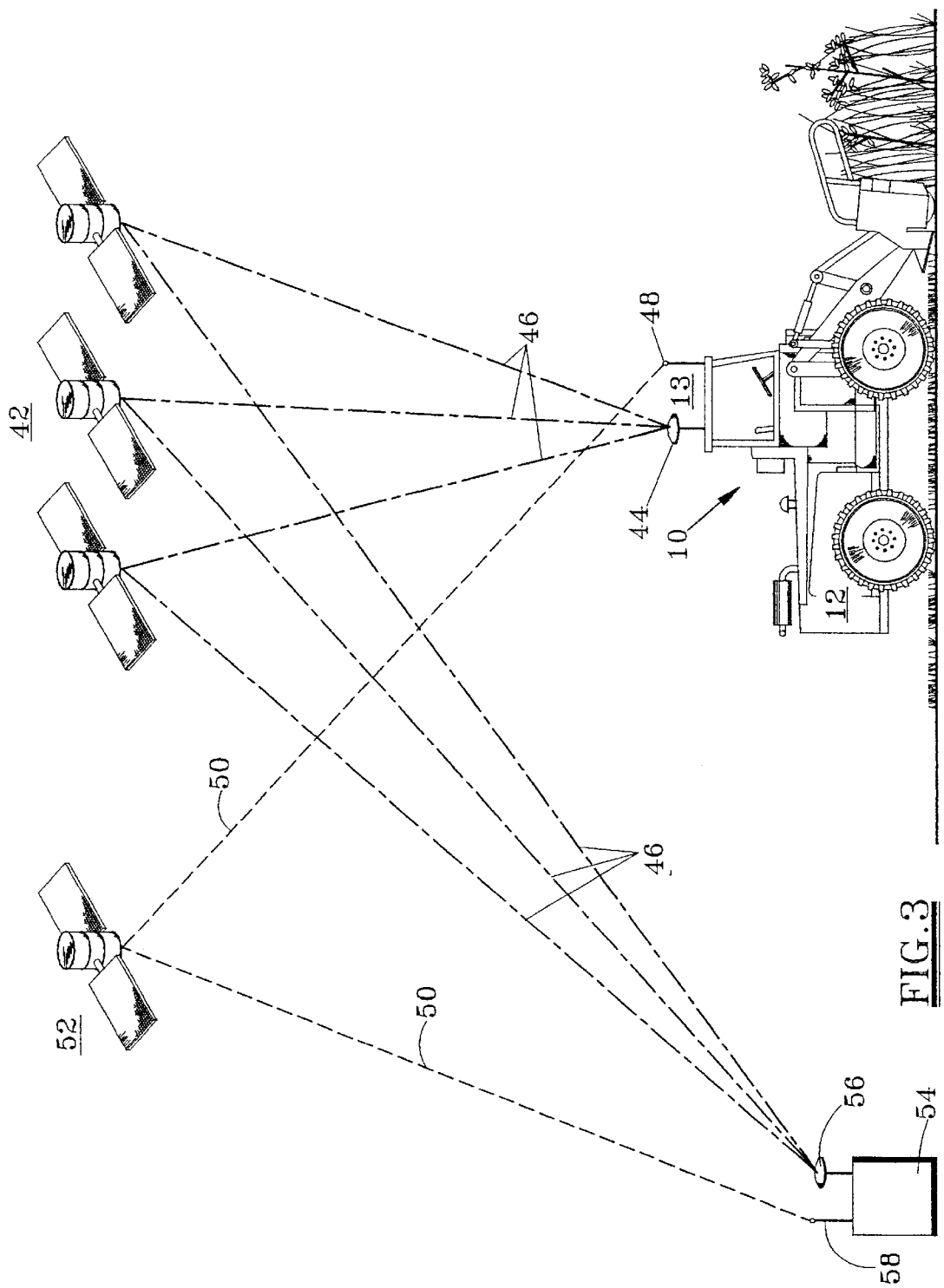
FIG. 3 is a pictorial representation illustrating the operation of the apparatus shown in FIG. 1.
Figure 3A:
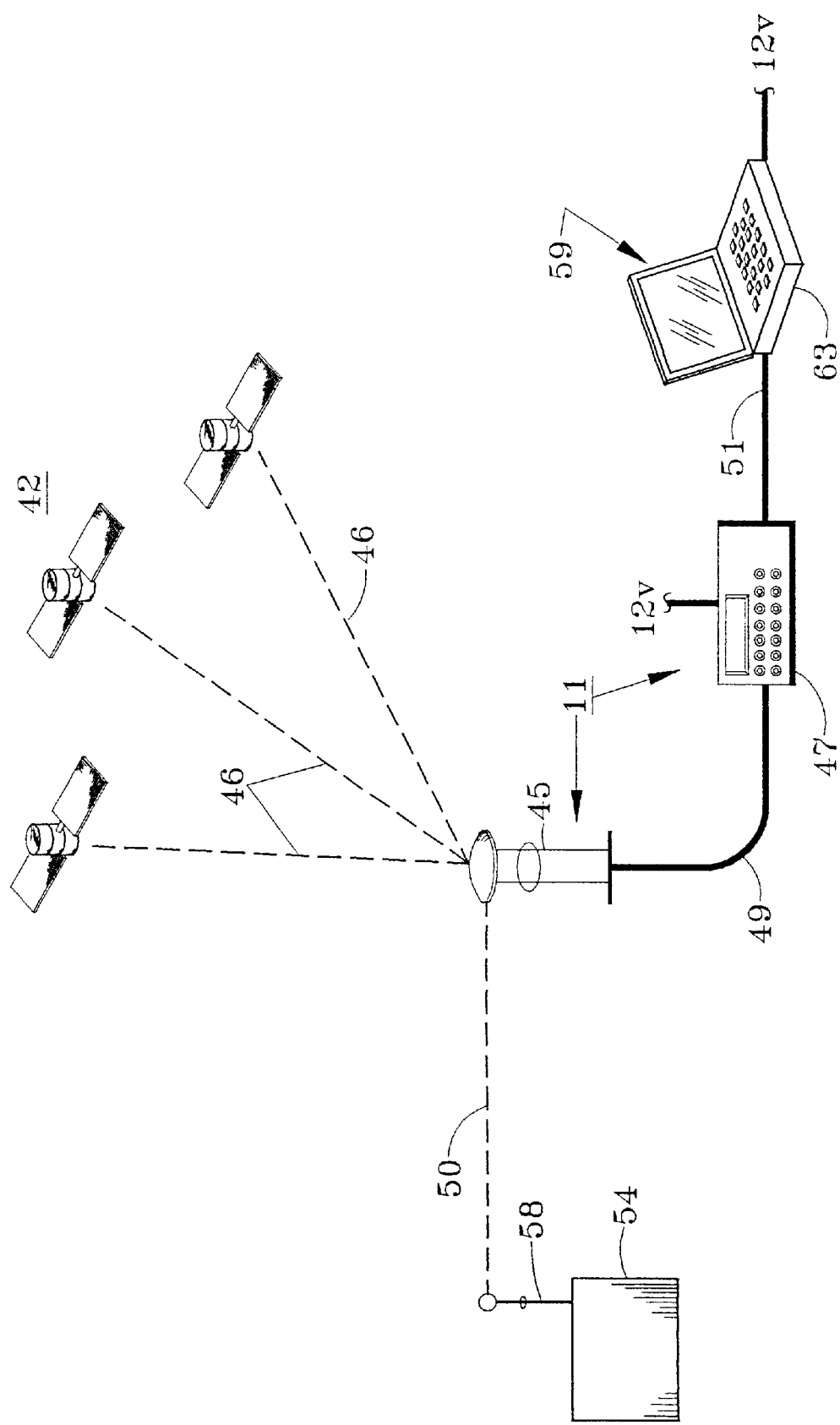
FIG. 3A is a pictorial representation illustrating the operation of an alternate embodiment apparatus.
Figure 4:
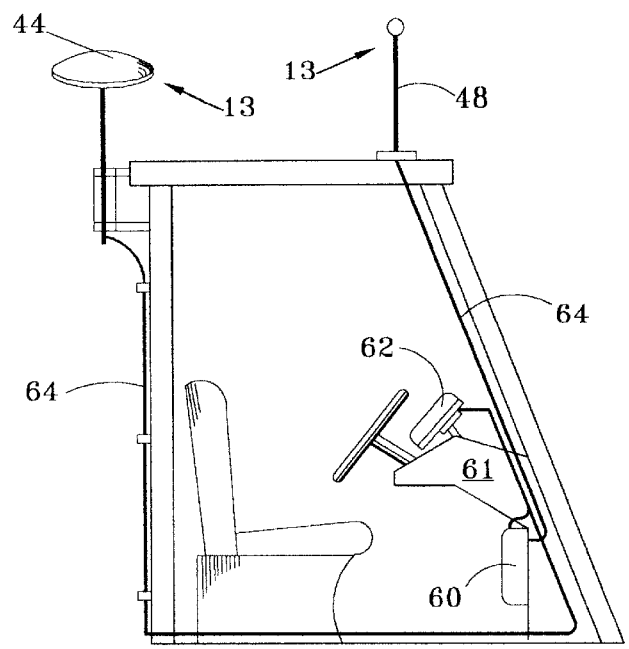
FIG. 4 is detailed side view of a cab interior of the preferred embodiment of the present invention, illustrating the placement of the guidance system.

Referring now to FIG. 3, a pictorial representation illustrating the operation of a remotely guided brush cutting, chipping and clearing apparatus 10 utilizing a guidance satellite network 42 is depicted. The satellite network 42 used in the preferred embodiment remotely guided, brush, cutting, chipping and clearing apparatus 10 may, for example, be the Global Positioning System (GPS) Network, consisting of 24 positioning satellites 42. In the remotely guided, brush, cutting, chipping and clearing apparatus 10, the vehicle 12 has mounted thereto an apparatus locator system 13 which includes a first satellite receiver antenna 44 for receiving a plurality of satellite network signals 46, sometimes referred to as "tracking" or remote positioning signals 46 and a second radio communication antenna 48 for receiving a differential correction signal 50 which may be transmitted from a communication satellite 52. A single base station 54 may also receive the plurality of satellite network signals 46 at a second satellite receiver antenna 56. The satellite network signals 46 may be received and processed at the base station 54 wherein a differential correction signal 50 is produced. The differential correction signal 50 may then be transmitted from a second radio antenna 58, located at the base station 54 to the communication satellite 52 for transmission to the first radio antenna 48. Alternatively, the base station 54 may also broadcast the differential correction signal 50 from the second radio antenna 58 directly to the first radio antenna 48. With reference to FIG. 3A, where structure similar to that in FIG. 3 is similarly numbered, a dual purpose antenna 45 may be mounted to the vehicle 12 in place of the first satellite receiver antenna 44 and second radio communication antenna 48, to receive both the plurality of satellite network signals 46 and the differential correction signal 50. The dual purpose antenna 45 is preferably in direct signal communication to a GPS signal processing unit 47, for example a Trimble® signal receiver, model no. Ag 120, via a first coaxial cable connection 49, which connects the dual purpose antenna 45 to the GPS signal processing unit 47. Alternatively, a second alternate embodiment apparatus locator system 11 can comprise the dual-purpose antenna 45 and the GPS signal-processing unit 47. A second cable connection 51 preferably engages the GPS signal processing unit 47 to a data processing unit 63, which also preferably includes a video display. The data processing unit 63 may for example be a COMPAQ® lap top computer, model no. Elite 4/50CX, which is mounted inside the cab 16 of the vehicle 12 and easily accessible to the operator (not shown). The dual-purpose antenna 45 receives the plurality of satellite network signals 46 and the differential correction signal 50. These signals 46, 50 are in turn conveyed along the first coaxial cable 49 to the GPS processing unit 47, where the differential correction signal 50 is applied to the calculation of position from the satellite network signals 46, to obtain a corrected actual position of the vehicle 12, relative to the surface of the earth. The corrected position is then relayed to the data processing unit/video display unit 63 via the second connection 51, where the graphic location of the vehicle 12 is displayed by the data processing unit/video display unit 63, relative to a particular line of travel 24.

Figure 13:
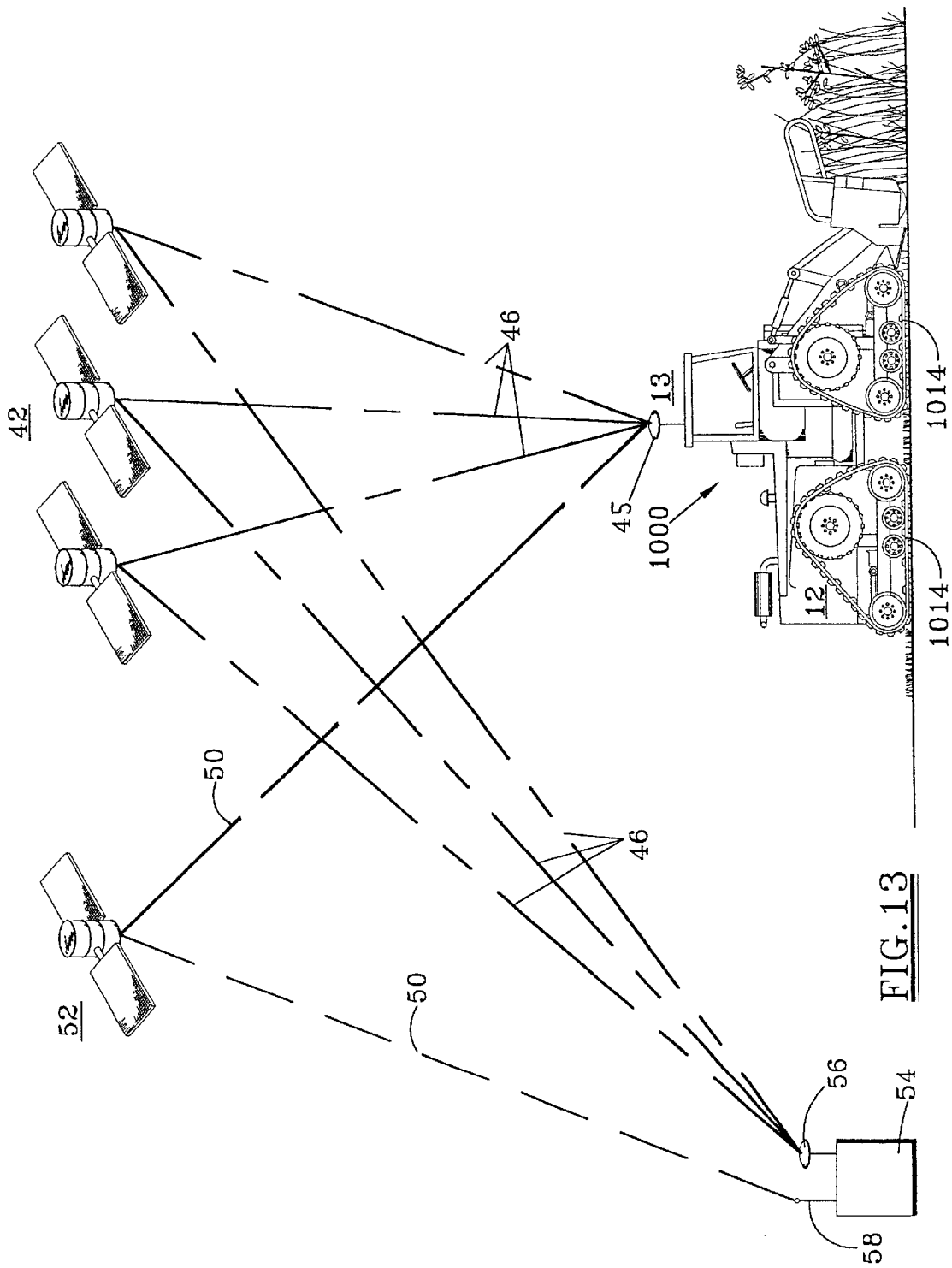
FIG. 13 is a pictorial representation illustrating the operation of the preferred embodiment of the present invention as shown in FIG. 11.

FIG. 13 illustrates the operation of the preferred embodiment of the present invention, a GPS guided ground-clearing apparatus 1000, where structure and operation similar to that in FIG. 3, is similarly numbered. The preferred embodiment GPS guided ground-clearing apparatus 1000, depicted in FIG. 13, operates much like the apparatus 10 in FIG. 3, but includes the improvement of being propelled by tracks or flat-surfaced tread 1014.

Referring now to FIGS. 3, 4, 5 and 13 the differential correction signal 50 which is received by the first communication antenna 48 is conveyed to a guidance system 61 mounted to the vehicle 12. The guidance system 61 may, for example, include a data processor 60 and a video display 62. A quantity of data (not shown), including survey coordinates, longitude and latitude coordinates or other survey information describing the desired direction of travel, including property lines, seismic lines, rights-of-way and the like, is preferably input into the data processor 60 and can be viewed on the video display 62. In the preferred embodiment, the data processor 60 may be an on-board central processing unit or personal computer, powered by the DC electrical system of the vehicle 12 (not shown). The first satellite receiver antenna 44 receives the satellite network signals 46 and conveys the signals 46 to the video display 62. The video display 62 may also preferably be powered by the DC electrical system of the vehicle 12 (not shown). The video display 62 then conveys the satellite network signals 46 to the data processor 60, wherein the satellite network signals 46 are corrected using the differential correction signal 50. The data processor 60 then transmits the corrected network signals 46 back to the video display 62, wherein the location of the vehicle 12, relative to the surface of the earth, is displayed on the video display 62 and, additionally the desired direction of travel of the vehicle 12 relative to the survey coordinates of the property line, seismic line, right-of-way and the like, may also be displayed on the video display 62. The satellite network signals 46 and the differential correction signal 50 are preferably communicated over a length of coaxial cable 64 disposed between and engaging the first satellite antenna 44 and the first communication antenna 48 to the guidance system 61.

With reference now to FIGS. 3, 13, 3A, 4 and 5, the operator (not shown) can view the video display 62 or data processor video display 63 to determine the location of the vehicle 12 and can simultaneously make steering corrections, via the steering means 18, to maneuver the vehicle 12 to achieve and maintain the desired direction of travel. In this manner, the vehicle 12 is remotely guided using the satellite network signals 46 and the differential correction signal 50 to precisely travel in a desired direction, easily locating intangible boundaries and paths such as property lines, seismic lines, rights-of-way and the like while cutting, chipping and clearing brush, in the absence of using slow, labor intensive and expensive traditional surveying methods and in the absence of creating permanent environmental and soil erosion concerns.

The above described guidance satellite system 42 yields extremely accurate remote positioning data where the satellite network signals 46 can be received by the satellite receiver antennae 44, 56 and where the differential correction signal 50 can be relayed to the first communication antenna 48. However, in areas where the satellite network signals 46 can not be received, such as for example in areas where there is a thick vegetation "canopy," i.e. swamps, jungles and thick forests, an alternative apparatus locator system must be employed to remotely guide the present invention 1000, alternate embodiment 2000 and the brush cutting, chipping and clearing apparatus 10.

Figure 6:
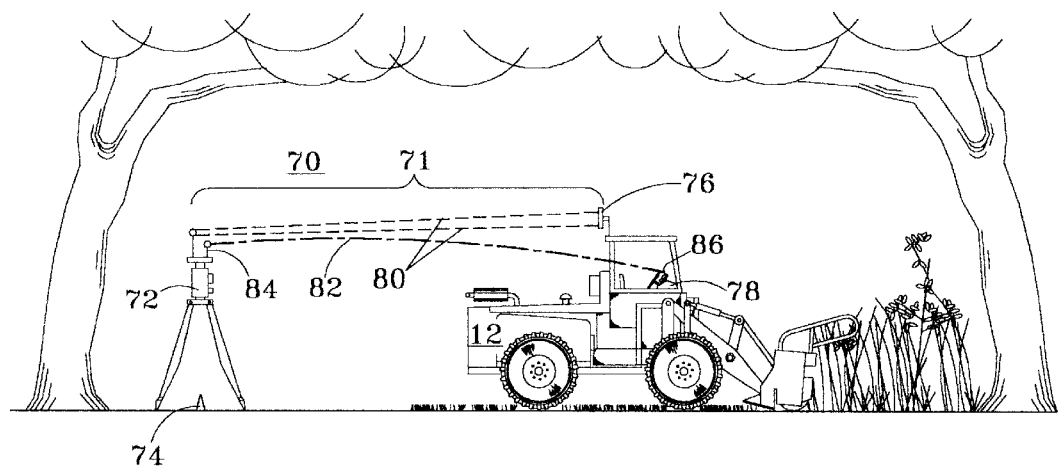
FIG. 6 is a pictorial representation illustrating the operation of an alternate embodiment of the present invention utilizing a geodetic survey apparatus locator system.

With reference now to FIG. 6, an alternate embodiment apparatus locator system 70 for remotely guiding a brush clearing apparatus 10, dependent upon remote positioning data and radio communication signals, for cutting, chipping and clearing brush is depicted. The alternate embodiment apparatus locator system 70, may for example be a semi-automated geodetic survey system 71. The semi-automated geodetic survey system 71 may, for example, may be a Geodimeter® System 4000 geodetic survey system. The preferred embodiment semi-automated survey system 71, preferably consists of a transportable station unit 72, positioned at a known point 74 and a mobile reflector 76, preferably mounted to the apparatus 10. A guidance system 78, having an internal data processor, a video display and a first radio antenna (not shown) is also mounted to the apparatus 10 and is in signal communication with the station unit 72. The station unit 72 continuously conveys a laser signal 80 to the reflector 76. The laser signal 80 is then reflected back to the station unit 72 and measurement data is obtained from the reflected laser signal 80 and is collected at the station unit 72. The guidance system 78, may preferably be affixed directly to the reflector 76 or may be mounted adjacent to the reflector 76. The reflector 76 may be affixed to a movable object such as the apparatus 10 or a hand held rod (not shown). The laser signal 80 is processed at the station unit 72, wherein a radio signal 82, containing the measurement information is created. The radio signal 82 is broadcast from a first radio antenna 84 to a second radio antenna 86 which is in communication with the guidance system 78. The radio signal 82 is processed by the guidance system 78, wherein the apparatus 10 location and the desired direction of travel is visually displayed by the guidance system 78 thus informing the operator (not shown) as to the location of the apparatus 10 with respect to the surface of the earth and illustrating the desired direction of travel.

Figure 7:
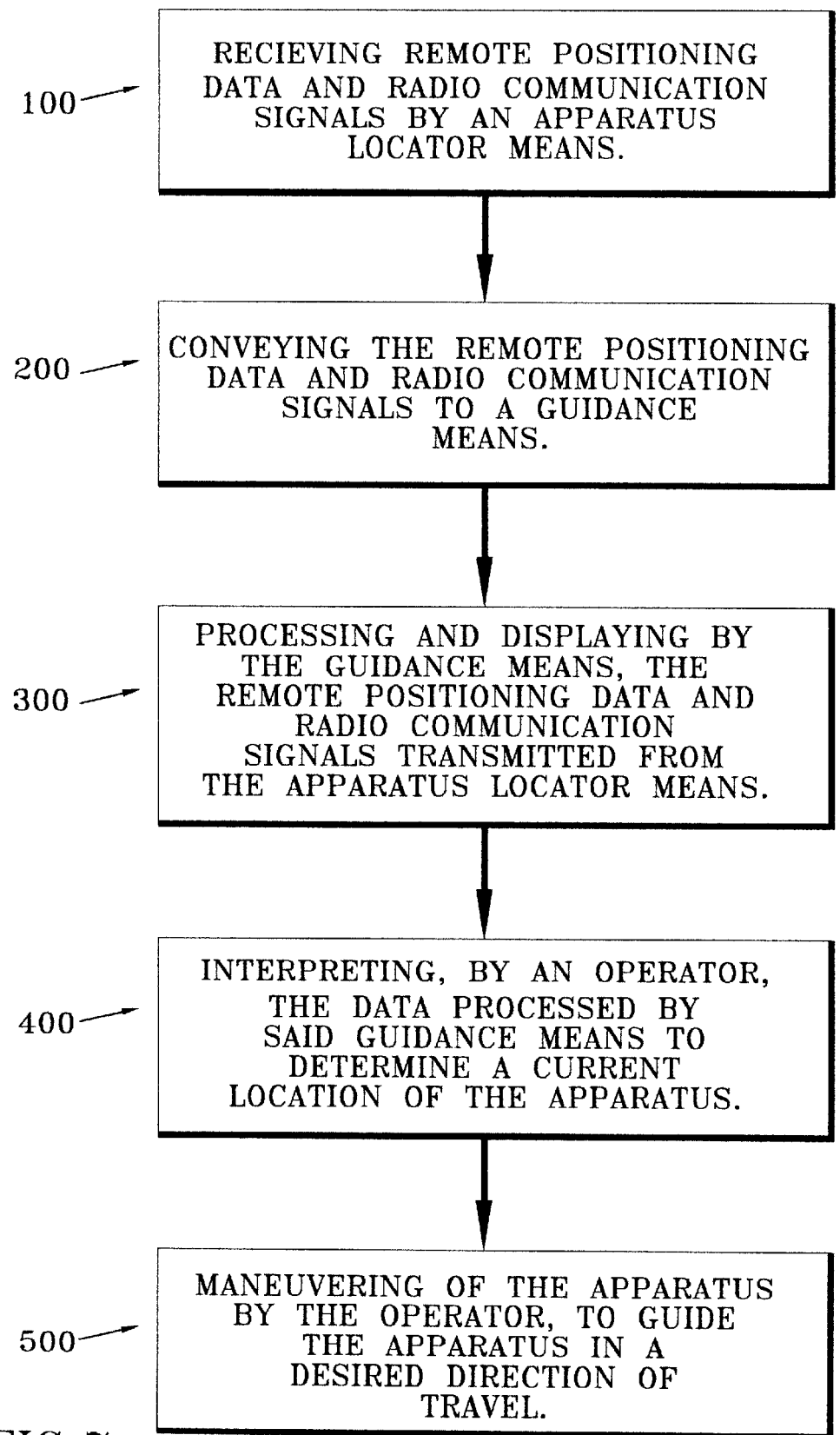
FIG. 7 is a block diagram depicting a preferred method of remotely guiding a brush cutting, chipping and clearing apparatus.

With reference to FIG. 7, a block diagram depicting a preferred method for using the present invention GPS guided ground-clearing apparatus 1000, alternate embodiment apparatus 2000 and the remotely guided brush cutting, chipping and clearing apparatus 10. Wherein all three apparatuses 1000, 2000, and 10 are dependent upon remote positioning data and radio communication signals, having an apparatus locator system 13, 70 for determining the location of the apparatuses 1000, 2000 and 10 and the desired direction of travel for the apparatuses 1000, 2000 and 10, relative to the surface of the earth is presented. The method preferably includes the steps of: receiving 100 by an apparatus locator system 11, 13, 70 the remote positioning data 46, 80 and radio communication signals 50; conveying 200 the remote positioning data 46, 80 and radio communication signals 50 to a guidance system 59, 61, 78; processing and displaying 300 by the guidance system 59, 61, 78 the remote positioning data 46, 80 and radio communication signals 50 transmitted from the apparatus locator system 11, 13, 70; interpreting 400, by an operator (not shown), the data processed by the guidance system 59, 61, 78 to determine a current location of the apparatuses 1000, 2000 and 10 with respect to the surface of the earth; and maneuvering 500 the apparatuses 1000, 2000 and 10, by the operator, to guide the apparatuses 1000, 2000 and 10 in a desired direction of travel.

Figure 8:
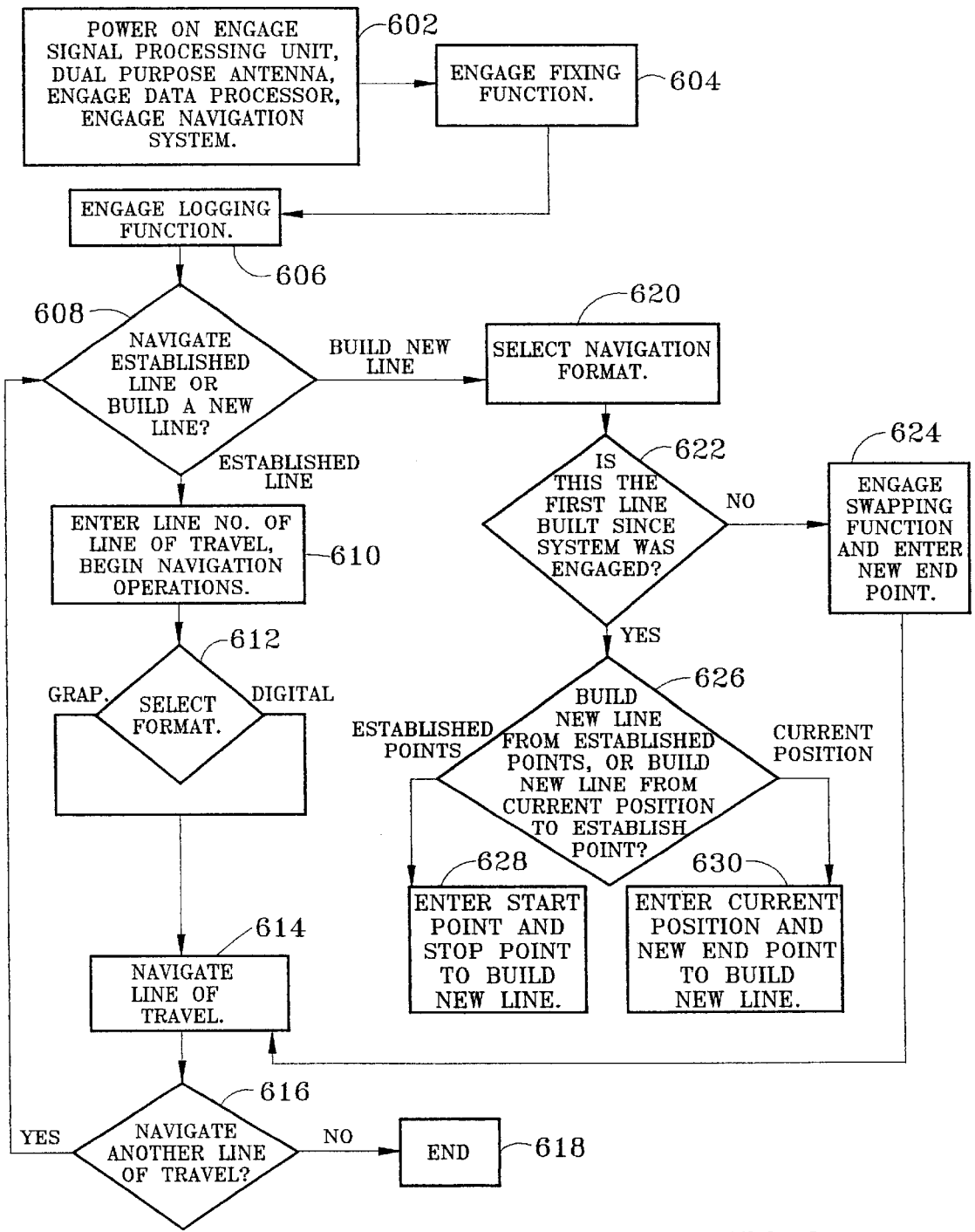
FIG. 8 is a block diagram illustrating a preferred method of navigating the remotely guided brush cutting, chipping and clearing apparatus.
Figure 10:
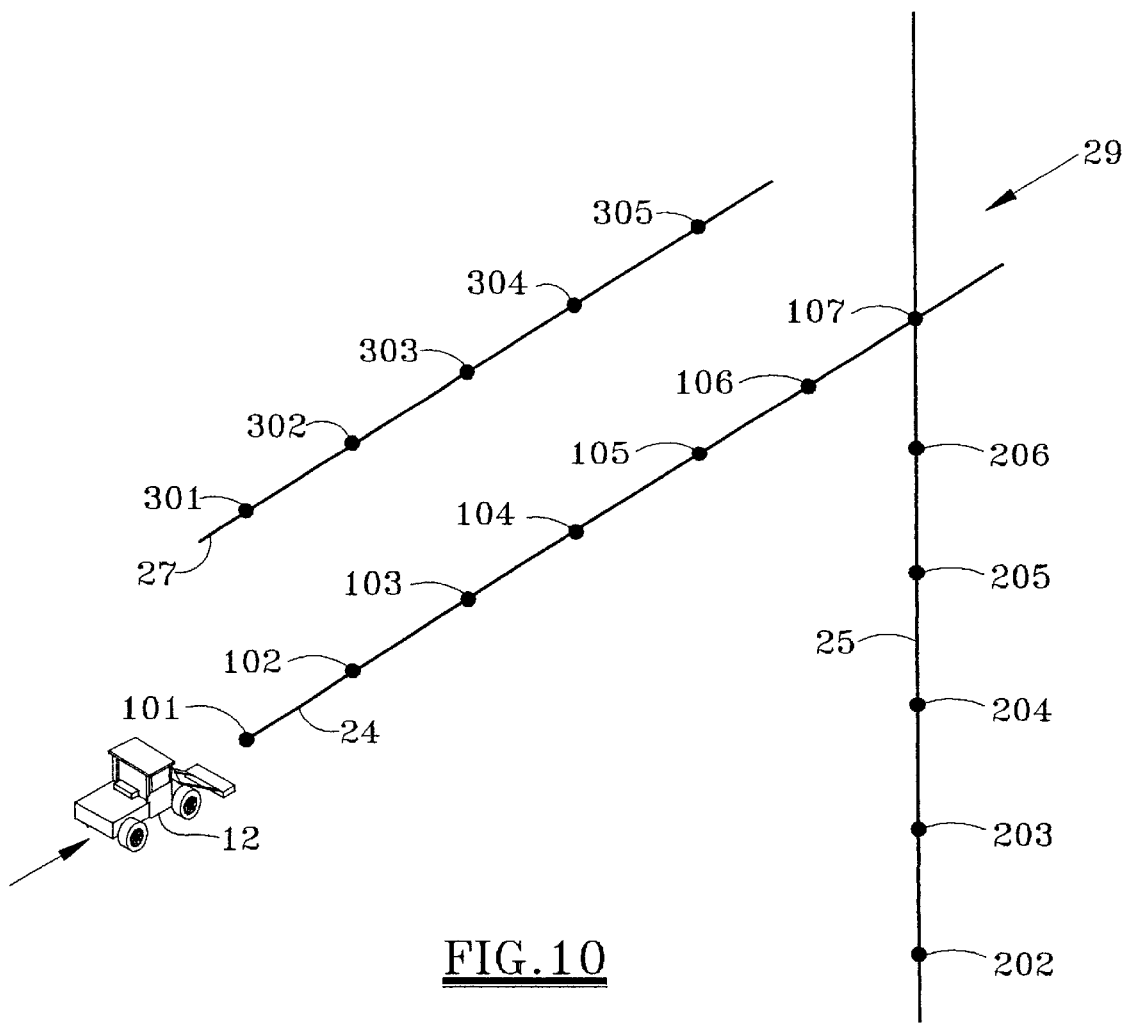
FIG. 10 is a top view, graphic representation of the vehicle navigating along various lines of travel and a plurality of specific data points located on the lines of travel.

With reference generally to FIGS. 1–7, and specifically to FIGS. 8 and 10, structure in FIGS. 8 and 10 which is similar to structure in FIGS. 1–7 is similarly numbered, a preferred method 600 for navigating the apparatuses 1000, 2000 and 10 along exact points 101, 102, 103, 104, 105, 106, 107 of a particular line of travel 24, is illustrated. As discussed above, the data processor 63, 60 is preferably mounted on the apparatuses 1000, 2000 and 10 and is in electrical communication with, and empowered by, an on board power source (not shown) which provides energy to propel the apparatuses 1000, 2000 and 10. The data processor 63, 60 also preferably includes a navigation system 600, which may for example be navigational software which interfaces with the GPS navigational satellite network 42. A second alternate embodiment apparatus guidance system 59 may comprise the data processor video display 63 and the navigational system 600 contained within the data processor video display 63. By way of example, the navigation system 600 may comprise navigational computer software licensed and distributed by Terra Services, Inc., under the GATOR-TRAC[SM] service mark. When the signal processing unit 47, the dual purpose antenna 45, the data processor 63, 60 is switched on or engaged 602, the navigational system 600 becomes accessible to the operator (not shown) and a variety of initial messages may be displayed on the data processor 63, 60. The initial messages displayed on the data processor 63, 60 may include, but are not limited to, identifying the serial port (not shown) which is currently in use by the data processor 63, 60, and may also illustrate a menu (not shown) of the various functions of the navigation system 600. Next, a fixing function 604 of the navigation system 600 is activated to determine an initial point number 101 on the initial line of travel 24, to determine the present location of the apparatus. The fixing function 604 performs the step of searching for the next point number 102 along the line of travel 24 to maintain a planned or sequential progression along the line of travel 24. The fixing function 604 can determine the navigational coordinates of the apparatus and/or beginning navigation position in terms of the particular line number and specific point number, i.e., line number 24, point number 101 (024101); latitude and longitude coordinates (not shown); and/or easting and northing coordinates (not shown). Preferably, the navigational coordinates are in a format consistent with the North American Dimension (NAD) 27 State Plane Grid, which is recognized as an accepted standard in the seismic and navigation industry. Additionally, the line number of the particular line of travel 24 and specific point numbers 101, 102, 103, 104, 105, 106, 107 along the line of travel 24 to be traversed by the apparatus 10, are preferably provided in a particular format known in the seismic industry as a "SEG P1" file (not shown). "SEG" is an abbreviation derived from the term "Society of Exploration Geophysicists." The SEG P1 file (not shown) consists of a specific set of navigation coordinates to be traversed by the apparatus 10, which are arranged in an industry standard digital, columnar manner, which can be uniformly down loaded into the data processor 63, 60 to easily interface with the navigation system 600. The SEG P1 file (not shown) generally provides specific navigation information for the particular line of travel 24 and the specific data point numbers 101, 102, 103, 104, 105, 106, 107 along the particular line of travel 24, the longitude and latitude coordinates, and the easting and northing coordinates to be traversed by the apparatuses 1000, 2000 and 10. The SEG P1 file (not shown) is preferably down loaded into the data processor 63, 60 prior to commencing the navigation system 600. After the fixing function 604 has been engaged, a logging or recording function 606 may selectively be activated. Activation of the logging function 606 records the location of the data points 101, 102, 103, 104, 105, 106, 107 along the particular line 24 traversed by the apparatus 10, for the purpose of constructing a map or plot 29, illustrated in FIG. 10, of the points 101, 102, 103, 104, 105, 106, 107 traversed by the apparatuses 1000, 2000 and 10. The logging function 606 will be discussed below in reference to FIG. 8. After deciding whether to activate the logging function 606, a decision step 608 must be made whether to navigate the apparatuses 1000, 2000 and 10 along an established or previously computed line 24 previously entered into the data processor 63, 60, or to construct a new line 25 using the information contained in the SEG P1 file or from coordinates in the data processor 63, 60. If navigation of the apparatuses 1000, 10 is to take place along a previously established line of travel 24, the operator (not shown) inputs a selection accordingly into the data processor 63, 60. Alternatively, the operator (not shown) may select, using the data processor 63, 60, to construct or build a new line of travel 25. If the operator (not shown) selects 610 an established line of travel 24 to navigate along, the operator (not shown) enters the particular line number 24. The operator (not shown) thereafter selects a navigational format 612 to be displayed on the video display 62 and/or the data processor 63. The operator (not shown) may select either a graphic representation similar to that shown in FIG. 10, where the apparatuses 1000, 2000 and 10 is displayed along the line of travel 24, wherein travel along the line of travel 24 and divergence from the line of travel 24 is depicted in a pictorial format, or the operator (not shown) may select a digital format (not shown) which displays numerical distance measurements between specific points 101, 102, 103, 104, 105, 106, 107 along the line of travel 24 and numerical distance measurements between the apparatuses 1000, 2000 and 10 and the line of travel 24 in generally accepted units of measurement, i.e. linear feet, yards, meters, etc. Once the navigational format 612 has been chosen, the operator (not shown) navigates 614 along the particular line of travel 24 and specific points 101, 102, 103, 104, 105, 106, 107 along the line of travel 24. At the completion of the navigation step 614, the operator (not shown) may selectively navigate 616 another line of travel 25 or end navigation operations 618. If at the decision step 608, the operator (not shown) decides to build a new line of travel 25, the operator (not shown) must select a navigation format 620 of either a digital or graphic display, as previously explained at step 612. After the navigation format is selected in step 620, the operator (not shown) is asked 622 whether the new line of travel 25 to be traversed is the first line constructed since the navigation system 600 has become engaged 602. Step 622 decides whether to engage a swapping function 624 used to assist in navigating a secondary or additional lines of travel (not shown). If at step 622, the operator (not shown) is then navigating a second or later line of travel 25 with respect to step 602, the swapping function 624 can be engaged and the last point 107 traversed on the previous line of travel 24, now becomes the starting point 107 in the new line of travel 25. Additionally, when the swapping function 624 is engaged, the operator (not shown) enters a new end point 202, and new line number 25, if necessary, and navigation of the new line 25 takes place at step 614. If at step 622, the operator (not shown) desires to construct and navigate a first line of travel 24 since the navigation system 600 was engaged at step 602, the operator (not shown) enters the selection into the data processor 63, 60, accordingly. After the decision is made in step 622, the operator (not shown) must again make a selection at step 626, whether to build a new line of travel 27 from established points, not inclusive of the operator's current position or build a new line 25 beginning from the operator's current position and terminating at a new end point 202. Depending on the operator's decision in step 626, the operator (not shown) may advance to step 628 and enter an established start point 301 and line number 27 and an established stop point 305 and line number 27 to build a new line 27 separate from the present location of the apparatuses 1000, 2000 and 10. The operator (not shown) then travels to the established start point 301 and traverses the apparatuses 1000, 2000 and 10 along the new line of travel 27. Alternatively, the operator (not shown) can proceed from step 626 to step 630 if the operator (not shown) desires to begin navigation on a new line of travel 25 beginning at the current location 107 of the apparatuses 1000, 2000 and 10 and ending at a known end point 202. In this manner, the operator (not shown) enters the location coordinates of the present location of the apparatuses 1000, 2000 and 10 and the terminal point 202 to be traversed and a new line 25 is graphically or digitally displayed on the video display 62 and/or the data processor 63. At the conclusion of step 628 and step 630, the line of travel 24 is then navigated 614 and the apparatus 10 generally traverses the line of travel 24 created by the data processor 63, 60. At the conclusion of the navigation step 614, the operator (not shown) has the opportunity to navigate 616 an additional line of travel 25, 27 or to end 618 navigation operations.

Figure 9:
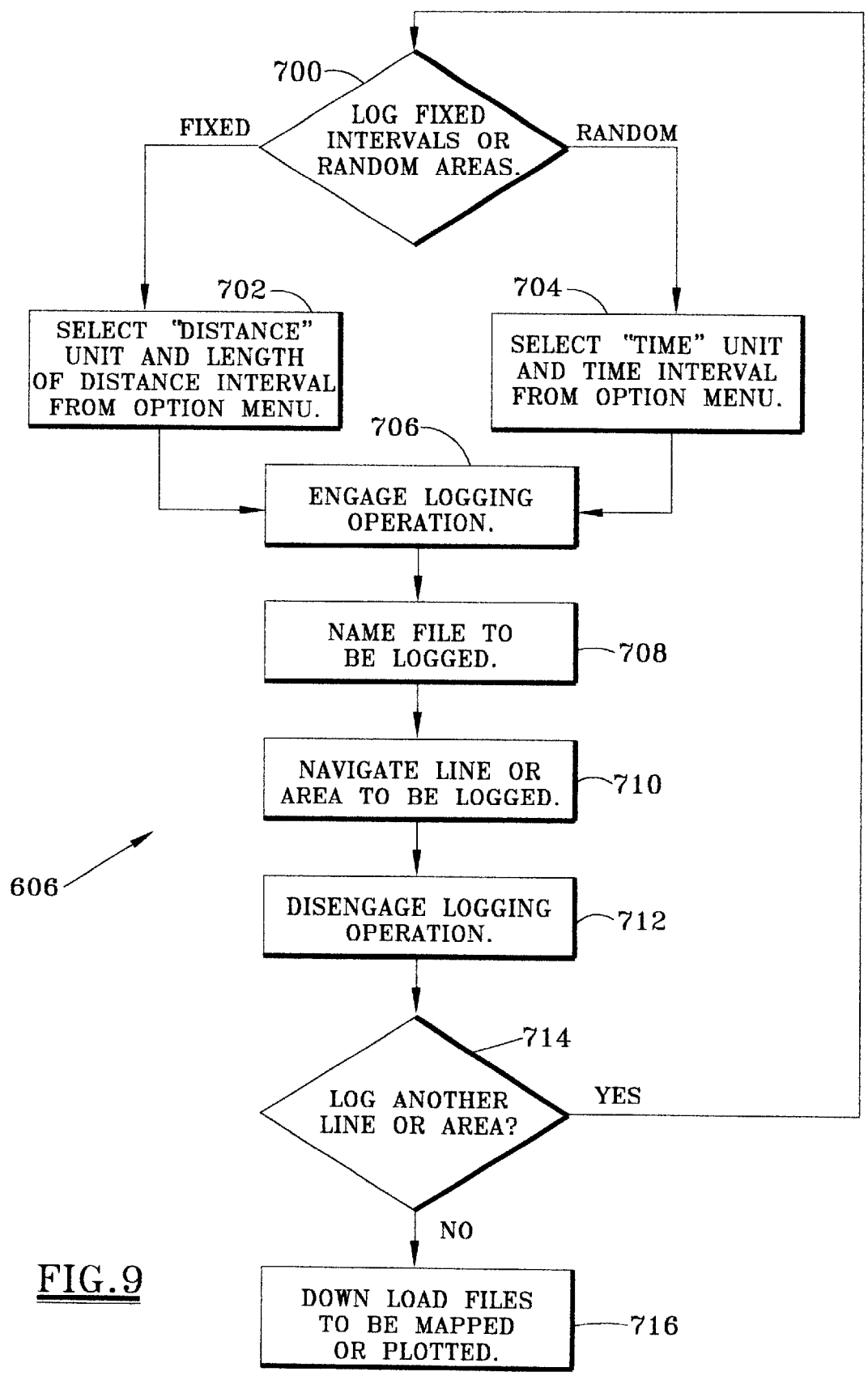
FIG. 9 is a block diagram illustrating a preferred method of logging the specific data points of a particular line of travel, navigated by the remotely guided brush cutting, chipping and clearing apparatus.

Referring now to FIG. 9 and FIG. 10, the logging or data recordation function 606 is illustrated in greater detail. As briefly discussed above, the logging function 606 creates a data record (not shown) of the navigational points 101, 102, 103, 104, 105, 106, 107 and line of travel 24 actually traversed by the apparatuses 1000, 2000 and 10, which can be used to create a map or plot 29 of the line 24 and data points 101, 102, 103, 104, 105, 106, 107 traversed by the apparatuses 1000, 2000 and 10. The data points 101, 102, 103, 104, 105, 106, 107 may for instance represent the drillsite locations, shot or vibration locations, and/or the geophone locations for use in seismic mapping. The map or plot 29 created by the logging function 606 may also be used by planners and developers of the land. The logging function 606, if engaged, allows the operator (not shown) to record or log 700 the specific location of the data points 101, 102, 103, 104, 105, 106, 107 traversed along on the particular line of travel 24 traversed by the apparatuses 1000, 2000 and 10, in selectively, fixed units of linear measurement 702 between successive data points on the line of travel 24. Alternatively, the operator (not shown) may record or log the data points 101, 102, 103, 104, 105, 106, 107 traversed along the line of travel 24, in a random manner according to the passage of fixed units of time 704 measured between successive data points 101, 102, 103, 104, 105, 106, 107 on the line of travel 24. The operator (not shown) in step 702 selects the fixed linear measurement unit, i.e., feet, yards, meters, miles, etc., and may also select the actual measured distance, i.e., 10 feet, 100 yards, 50 meters, etc., from the options menu of the navigation system 600 to be measured between successive data points 101, 102, 103, 104, 105, 106, 107 along the line of travel 24. The operator (not shown) in step 704 selects the specific unit of time measurement, i.e., second, minute, hour, etc. and the specific time interval, i.e., 30 seconds, 5 minutes, 1 hour, etc., from the options menu of the navigational system 600, to record the time interval which passes between random successive data points (not shown) traversed along a path (not shown) in a random manner. Having selected the measurement format in step 702 or step 704, the operator (not shown) engages the logging function 706 and begins recording the actual data points 101, 102, etc. traversed by the apparatuses 1000, 2000 and 10. After the logging or recordation function 706 has commenced, the operator (not shown) may preferably enter the name of the particular traversal 708 into the data processor 60, to easily identify and access the recorded information. The operator (not shown) and apparatuses 1000, 2000 and 10 then traverse 710 the particular line or travel 24 to be logged as discussed in step 614, or FIG. 8, above. The logging function 706 is disengaged 712 once the apparatus 10 has completed traversing the data points 106, 107 of the particular line of travel 24. After the logging operation 706 has become disengaged 712, the operator (not shown) may log 714 an additional line of travel 25, 27 by returning to step 700, or can alternatively, down load 716 the logged or recorded line(s) of travel 24 and data points 101, 102, 103, 104, 105, 106, 107 for use in creating a map or plot 29 of the area traveled or covered by the apparatuses 1000, 2000 and 10.

It will be appreciated that these and other embodiments may be provided to navigate a remotely guided brush cutting, chipping and clearing apparatus, dependent upon remote positioning data and radio communication signals, having an apparatus locator means for determining the location of the apparatus and a guidance means for displaying the desired direction of travel for the apparatus, relative to the surface of the earth. Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. A GPS guided ground-clearing apparatus, dependent upon a plurality of GPS network signals and radio communication signals, comprising:

a tracked vehicle, having two or more tracks to propel the vehicle, said two or more tracks being conventionally mounted to the vehicle;

a hydraulic support system and a rotational power supply mounted to said vehicle;

a cutting head for cutting, chipping and clearing brush and trees, said cutting head being mounted to said hydraulic support system and engaged to said rotational power supply;

an apparatus locator means mounted to said vehicle for receiving the plurality of GPS network signals and the radio communication signals; and a guidance means in signal communication with said apparatus locator means, for continuously reading and processing the plurality of GPS network signals and the radio communication signals to determine an instantaneous location of the vehicle relative to the surface of the earth and, in response thereto, to guide the vehicle for movement in a desired direction and to assist the vehicle in maintaining travel in the desired direction and returning the vehicle to the desired direction.

2. The GPS guided ground-clearing apparatus, dependent upon a plurality of GPS network signals and radio communication signals, as defined in claim 1, wherein the cutting head includes a housing, within which is secured a rotatable horizontal shaft engaged to said rotational power supply, and having a plurality of mounting discs laterally mounted to the horizontal shaft, a plurality of pivotal, U-shaped, throw-out knives mounted to the mounting discs and at least one bumper mounted to the housing to facilitate the cutting, chipping and clearing of brush and trees.

3. The GPS guided ground-clearing apparatus, dependent upon a plurality of GPS network signals and radio communication signals, as defined in claim 2, wherein said cutting head is vertically adjustable.

4. The GPS guided ground-clearing apparatus, dependent upon a plurality of GPS network signals and radio communication signals, as defined in claim 1, wherein said apparatus locator means comprises a dual purpose antenna for receiving the remote positioning data and radio communication signals, and a GPS signal processing unit.

5. The GPS guided ground-clearing apparatus, dependent upon a plurality of GPS network signals and radio communication signals, as defined in claim 1, wherein the guidance means comprises a data processor mounted to said vehicle, and is in electronic communication with the apparatus locator means, to receive and continually process the plurality of GPS network signals and radio communication signals for providing navigational guidance, to guide the apparatus for movement in the desired direction.

6. The GPS guided ground-clearing apparatus, dependent upon plurality of GPS network signals and radio communication signals, as defined in claim 5, wherein the data processor further comprises a central processing unit for continuously processing the plurality of GPS network signals and radio communication signals and a display means for visually conveying the remote positioning data and the desired direction to an operator.

7. The GPS guided ground-clearing apparatus, dependent upon a plurality of GPS network signals and radio communication signals as defined in claim 6, wherein the radio communication signals comprise a plurality of differential correction signals generated from at least one GPS base station.

8. The GPS guided ground-clearing apparatus, dependent upon a plurality of GPS network signals and radio communication signals, as defined in claim 6, wherein the display means is a video display screen for displaying a current position of the vehicle relative to the surface of the earth and the desired direction of travel for the vehicle.

9. A method of guiding a GPS guided ground-clearing apparatus, dependent upon a plurality of GPS network signals and radio communication signals, comprising the steps of:

receiving by an apparatus locator means, the plurality of GPS network signals and radio communication signals;

conveying the plurality of GPS network signals and radio communication signals from said apparatus locator means to a guidance means;

inputting into the guidance means, a desired direction of travel as a function of location;

continuously processing and displaying by the guidance means, the desired direction of travel, and the plurality of GPS network signals and the radio communication signals transmitted from said apparatus locator means;

instantaneously comparing by the guidance means, the present location of the vehicle to the desired direction of travel;

interpreting, by an operator, the data processed by the guidance means; and maneuvering of the vehicle through input to the guidance means by the operator based on the interpreted data, to guide the vehicle in a desired direction of travel and to maneuver the vehicle in maintaining travel in the desired direction and returning the vehicle to the desired direction of travel.

10. The method of guiding a GPS guided ground-clearing apparatus, dependent upon a plurality of GPS network signals and radio communication signals, as defined in claim 9, wherein said apparatus locator means comprises a dual purpose antenna for receiving the remote positioning data and radio communication signals, and a GPS signal processing unit.

11. The method of guiding a GPS guided ground-clearing apparatus, dependent upon a plurality of GPS network signals and radio communication signals, as defined in claim 9, wherein the guidance means comprises a data processor mounted to said vehicle, and is in electronic communication with the apparatus locator means, to receive and continuously process the plurality of GPS network signals and radio communication signals for providing navigational guidance, to guide the apparatus for movement in the desired direction.

12. A GPS guided ground-clearing apparatus, dependent upon a plurality of GPS network signals and radio communication signals, comprising:
   a tracked vehicle, having two or more tracks to propel the vehicle, said two or more tracks being conventionally mounted to the vehicle;
   a hydraulic support system and a rotational power supply mounted to said vehicle;
   a snow plow for clearing snow and ice from the surface of the ground, said snow plow being mounted to said hydraulic support system and engaged to said rotational power supply;
   an apparatus locator means mounted to said vehicle for receiving the plurality of GPS network signals and the radio communication signals; and
   a guidance means in signal communication with said apparatus locator means, for continuously reading and processing the plurality of GPS network signals and the radio communication signals to determine an instantaneous location of the vehicle relative to the surface of the earth and, in response thereto, to guide the vehicle for movement in a desired direction and to assist the vehicle in maintaining travel in the desired direction and returning the vehicle to the desired direction.

13. The GPS guided ground-clearing apparatus, dependent upon a plurality of GPS network signals and radio communication signals, as defined in claim 12, wherein said apparatus locator means comprises a dual purpose antenna for receiving the remote positioning data and radio communication signals, and a GPS signal processing unit.

14. The GPS guided ground-clearing apparatus, dependent upon a plurality of GPS network signals and radio communication signals as defined in claim 13, wherein the radio communication signals comprise a plurality of differential correction signals generated from at least one GPS base station.

15. The GPS guided ground-clearing apparatus, dependent upon a plurality of GPS network signals and radio communication signals, as defined in claim 12, wherein the guidance means comprises a data processor mounted to said vehicle, and is in electronic communication with the apparatus locator means, to receive and continuously process the plurality of GPS network signals and radio communication signals for providing navigational guidance, to guide the apparatus for movement in the desired direction.

16. The GPS guided ground-clearing apparatus, dependent upon plurality of GPS network signals and radio communication signals, as defined in claim 14, wherein the data processor further comprises a central processing unit for continuously processing the plurality of GPS network signals and radio communication signals and a display means for visually conveying the remote positioning data and the desired direction to an operator.

17. The GPS guided ground-clearing apparatus, dependent upon a plurality of GPS network signals and radio communication signals, as defined in claim 15, wherein the display means is a video display screen for displaying a current position of the vehicle relative to the surface of the earth and the desired direction of travel for the vehicle.

\* \* \* \* \*